E. A. JOHNSTON.
STEERING DEVICE FOR TRACTION ENGINES.
APPLICATION FILED SEPT. 14, 1914. RENEWED JAN. 16, 1918.
1,269,609.
Patented June 18, 1918.
3 SHEETS—SHEET 1.
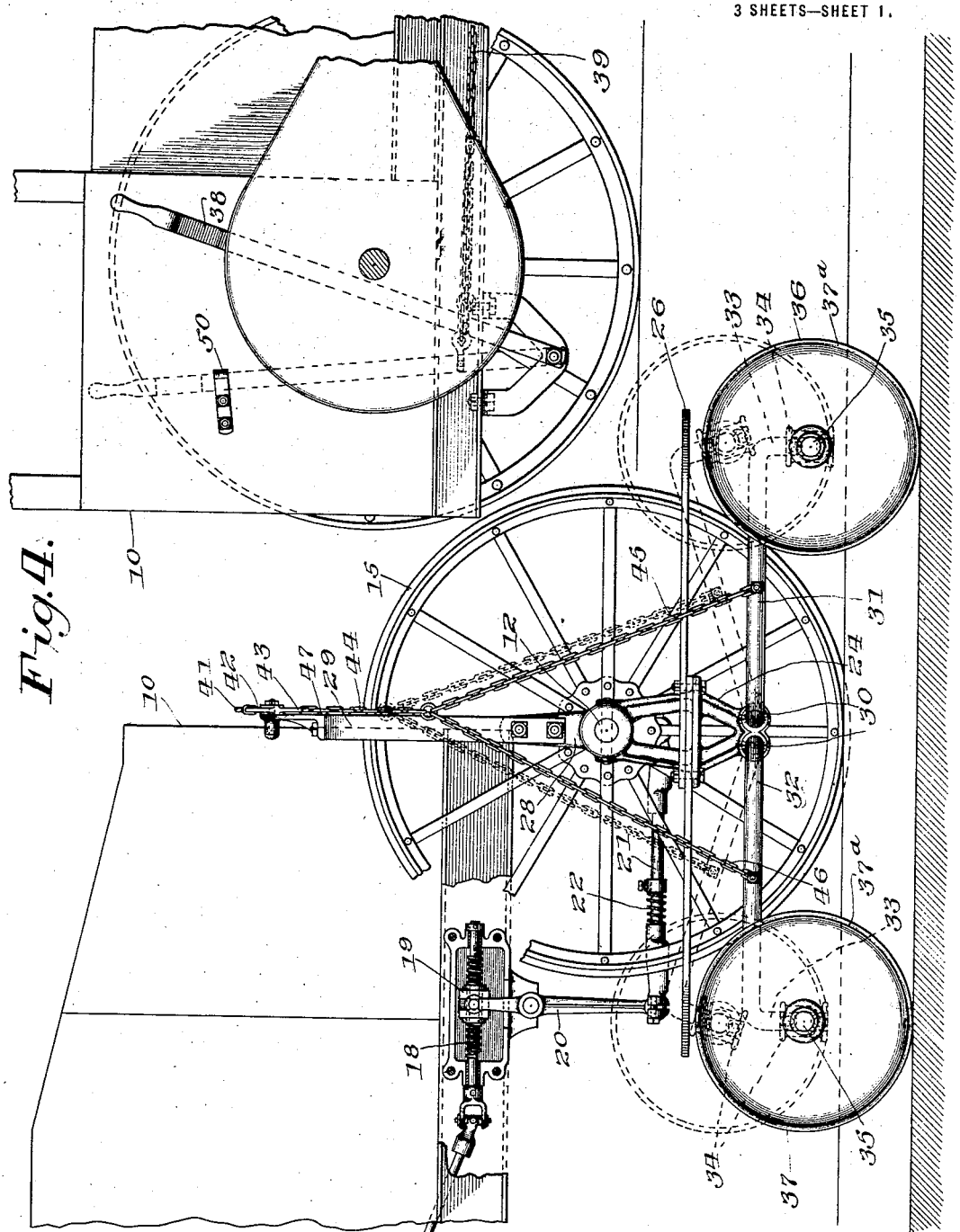
Witnesses:
C. C. Palmer
Chas. L. Byron
Inventor:
Edward A. Johnston,
By Chas. E. Lord
Atty.

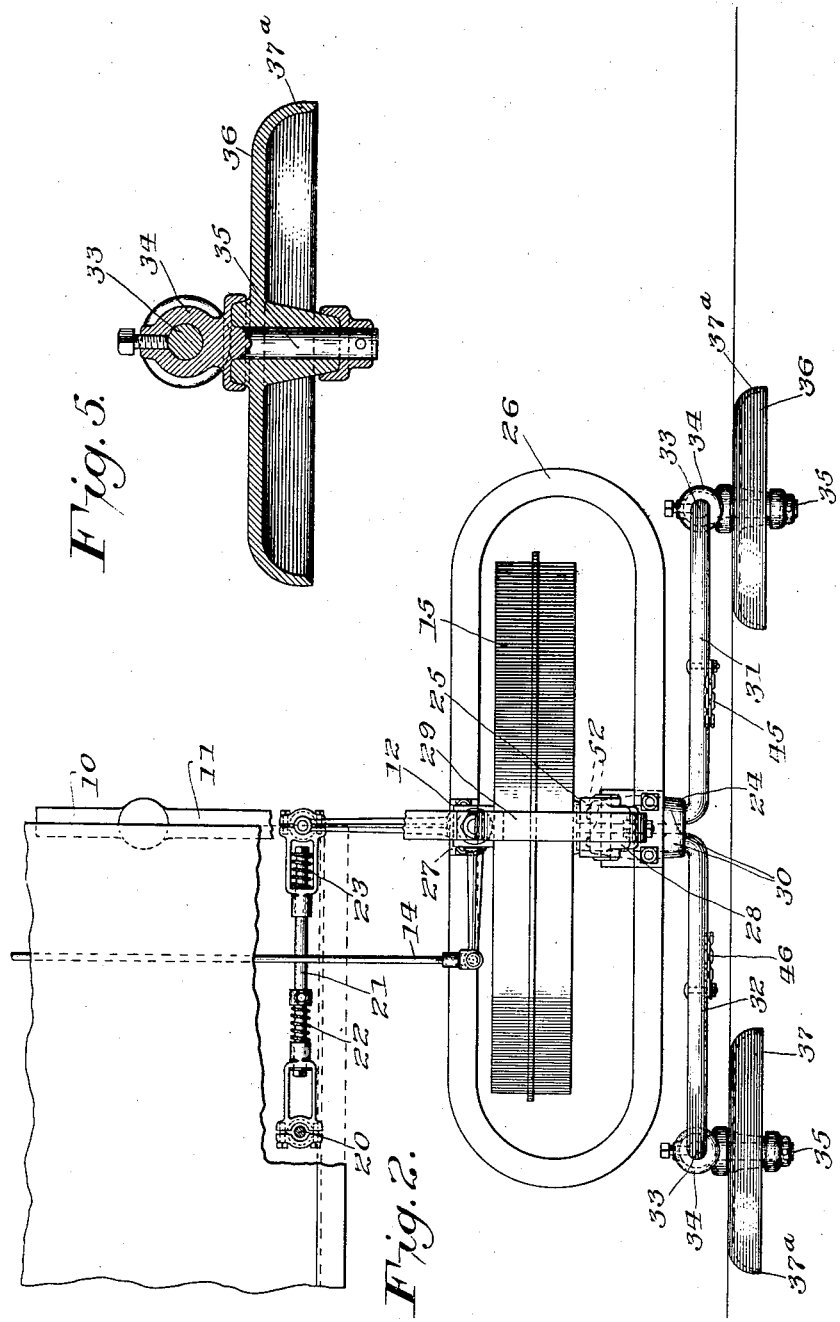

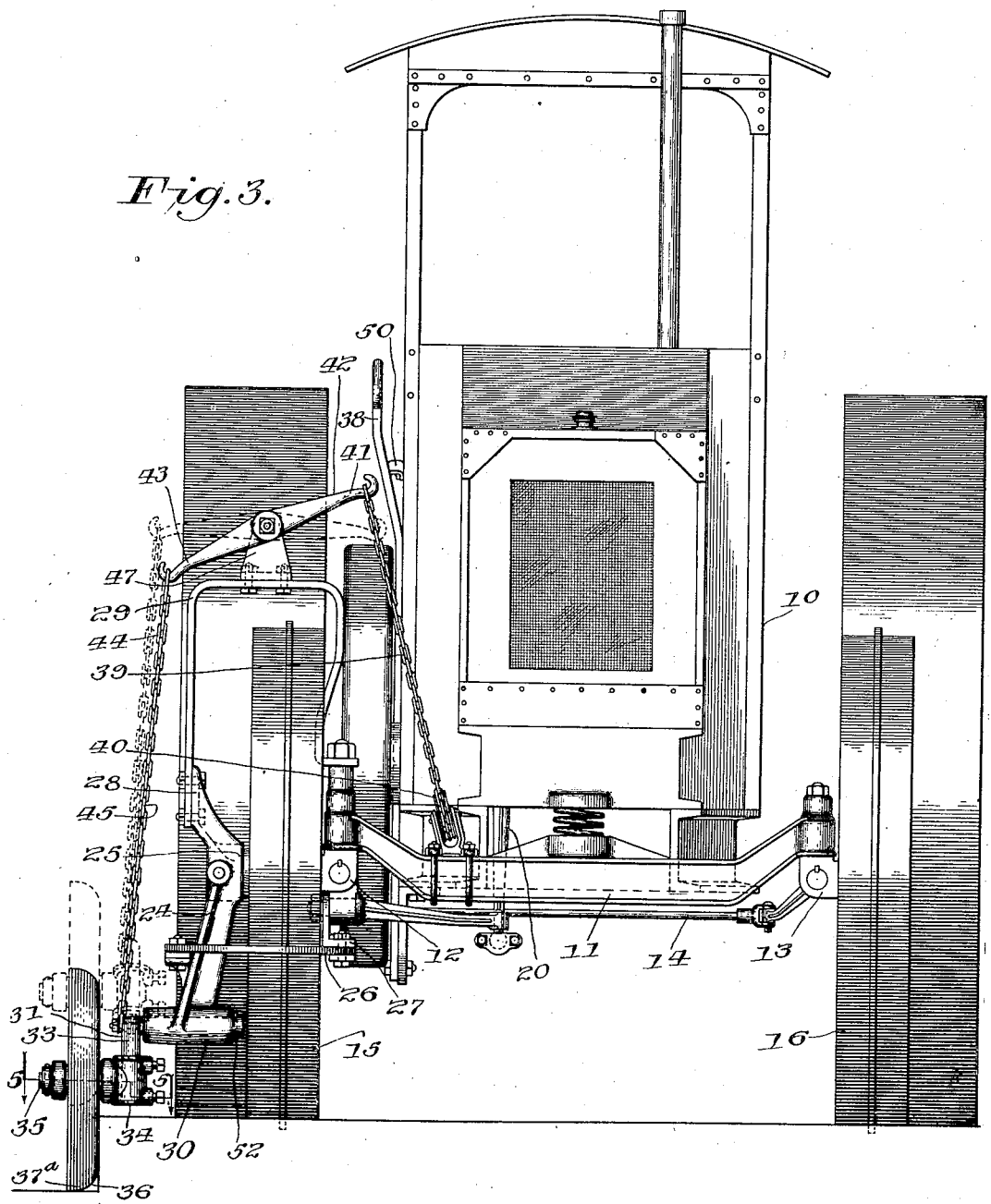

UNITED STATES PATENT OFFICE.

EDWARD A. JOHNSTON, OF CHICAGO, ILLINOIS, ASSIGNOR TO INTERNATIONAL HARVESTER CORPORATION, A CORPORATION OF NEW JERSEY.

STEERING DEVICE FOR TRACTION-ENGINES.

1,269,609.  Specification of Letters Patent.  Patented June 18, 1918.

Application filed September 14, 1914, Serial No. 861,530. Renewed January 16, 1918. Serial No. 212,154.

*To all whom it may concern:*

Be it known that I, EDWARD A. JOHNSTON, a citizen of the United States, residing at Chicago, in the county of Cook and State of Illinois, have invented certain new and useful Improvements in Steering Devices for Traction-Engines, of which the following is a full, clear, and exact specification.

This invention relates to steering devices for traction engines.

The main object of this invention is to simplify and to improve steering devices for traction engines.

Another object of this invention is to provide an inexpensive and automatic steering device adapted to meet the requirements for successful commercial operation.

These and other objects are accomplished by providing a traction engine having an axle member, an automatic steering device supported by said axle member, and means for raising and lowering said steering device.

This invention is illustrated on the accompanying sheets of drawings, in which—

Figure 1 is a side elevation of a portion of a traction engine and my improved steering device therefor;

Fig. 2 is a plan view of the same steering device connected to a traction engine;

Fig. 3 is a front elevation of the steering device and traction engine showing the manner in which said steering device is connected to said traction engine;

Fig. 4 is a fragmentary side elevation of the rear of the traction engine showing the operating lever for raising and lowering pilot wheels out of and into the furrow; and, Fig. 5 is a detail sectional view of one of the furrow pilot wheels taken in the planes of irregular line 5—5 of Fig. 3.

The various novel features of my invention will be apparent from the following description and drawings, and will be particularly pointed out in the appended claims.

The traction engine 10 shown in the drawings may be of any type having a relatively stationary front axle member 11 in which stub axles 12 and 13 are journaled, said axles being interconnected by the usual automobile type connecting link 14. Mounted upon the stub axles 12 and 13 respectively are the regular front steering wheels 15 and 16 of the traction engine, said wheels being controllable by hand from the cabin of the traction engine by means of connections, including a hand-operated steering axle 17 operatively connected with a properly supported screw 18, embraced by a nut 19, which may be actuated by turning the screw 18, said nut being operatively connected to the stub axles for transmitting motion thereto by a pivotally mounted arm 20 and link 21. Surrounding this link 21 are two coiled springs 22 and 23, which serve to cushion jars which otherwise might be transmitted from the steering wheels, and also which permit the traction engine to be automatically guided by the steering device.

This automatic steering device is connected to the traction engine by means, including a casting or bracket member 24 supported by the end of the stub axle 12, said casting having a cap portion 25 serving the regular purposes of caps for the ends of axles. This casting 24 is braced by a band 26 of metal, which surrounds the front traction engine wheel 15, and is secured to the casting 24 and a portion of the stub axle 12 by an angle member 27. Also connecting another portion 28 of the casting 24 and the upper part of stub axle 12 is a strap 29.

Adjacent bearings 30 formed in the lower part of casting 24 receive inner ends of oppositely extending steering poles 31 and 32, which are pivotally mounted in the bearings 30. Adjustably secured to the outer downwardly bent end portions 33 of the steering poles 31 and 32 are members 34 having axles 35. Rotatably mounted upon these axles are furrow pilot wheels 36 and 37, each of which has a curved periphery 37ª adapted to assist in maintaining said furrow pilot wheels in a furrow for guiding the traction engine. These two coöperating guiding wheels 36 and 37 mounted at the ends of the oppositely extending pivotally mounted steering poles may be raised out of and lowered into the furrow by a lever 38, the latter being connected to the steering poles by a chain 39, which passes around a pulley 40 supported by the relatively stationary axle member 11, said chain 39 being hooked over one end 41 of a lever 42, the other end 43 of the lever being releasably connected to a chain 44 terminating in branches 45 and 46, which are secured respectively to the steering poles 31 and 32. The lever member 42 is pivotally mounted in a bracket 47 secured to the upper part of strap 29. If it is desired to raise the pilot wheels 36 and 37 out of the furrow the same may be accomplished by merely drawing the hand lever 38 backwardly, as viewed in Fig. 4, to its dotted line position, in which position it may be held by a suitable member 50, secured to the side of the cabin. To lower the furrow pilot wheels into the furrow the lever 38 is merely released from the member 50, whereupon said wheels 36 and 37 will drop into the furrow by their own weight. These furrow pilot wheels, which are secured to the pivotally mounted steering poles 31 and 32, are raised and lowered simultaneously, and coöperate in a manner to automatically guide the traction engine to which they are connected by bearing against the side wall of the furrow. With the furrow pilot wheels 36 and 37 in the furrow, as shown in full lines in Figs. 1, 2 and 3, for properly guiding the traction engine, the hand operated steering axle 17 should be moved in the direction to place the spring 23 under compression, tending to cause the front wheels 15 and 16 of the traction engine to move away from the furrow. In other words, a force should be yieldingly exerted upon the front wheels 15 and 16 of the traction engine such that if the furrow pilot wheels 36 and 37 were raised out of the furrow the traction engine immediately would turn away from the furrow. This force exerted by the spring 23 tends to keep the pilot wheels 36 and 37 hugging the side wall of the furrow.

This steering device, while it may be raised and lowered out of the furrow, cannot be controlled directly from the cabin of the engine for steering the traction engine. This whole steering device is readily removable from the traction engine, the same being accomplished by merely withdrawing two locking pins 52, which pass through openings in the inner ends of the inner bent portions of the steering poles 31 and 32. When these pins are removed the steering poles may be withdrawn from the bearing portions 30 of the casting 24. This will disconnect the entire steering device from the traction engine, the chain 44 being slipped out of engagement with one end 43 of the lever 42.

It is apparent that there may be various modifications of my invention other than that here particularly shown and described, and it is my intention to cover all such modifications which do not involve a departure from the spirit and scope of my invention as set forth in the following claims.

What I claim as new is:

1. In combination, a traction engine having an axle, a wheel on said axle, a wheel retaining element on the axle, and a furrow pilot steering device supported by said wheel retaining element.

2. In combination, a traction engine having an axle, a wheel on said axle, a wheel retaining element on the axle and having a bearing portion, and a furrow pilot steering member pivotally mounted in said bearing portion.

3. In combination, a traction engine having an axle, a wheel on said axle, a wheel retaining element on the axle and having a bearing portion, a furrow pilot steering device pivotally mounted in said bearing portion, and means for raising and lowering said steering device.

4. In combination, a traction engine having an axle, a wheel on said axle, a wheel retaining element on the axle and having a plurality of bearing portions, oppositely extending furrow pilot steering members pivotally mounted in said bearing portions, and means centrally arranged with respect to said steering members for raising and lowering the steering members.

5. In combination, a traction engine having an axle, a member connected to one portion of said axle, a steering member mounted in said first mentioned member, bracing means connecting said first mentioned member with another portion of said axle, a pivotally mounted lever mounted on said bracing means, and means associated with said steering member and lever for raising said steering member.

6. In combination, a traction engine having a stub axle, a bracket hung upon the end of said axle, a steering pole supported thereby, a furrow pilot wheel carried by said pole, a main wheel on said axle, and a manually controlled steering connection from the engine to said main wheel including a spring for yieldingly holding said furrow pilot wheel against the side wall of a furrow.

7. In a steering device for traction engines, the combination of a hinged stub axle on the traction engine, independently swingable furrow pilot wheels mounted on said stub axle and extending in different directions, and means for raising and lowering said furrow pilot wheels.

8. In combination, a traction engine having an axle, said axle carrying a wheel and a member outside the wheel, steering poles oppositely and pivotally mounted in the member and furrow guide means carried thereby.

9. In combination, a traction engine having an axle, said axle carrying a wheel and a member outside the wheel, independently acting steering poles oppositely and pivotally mounted in the member and furrow guide means carried thereby.

10. In combination, a traction engine having an axle, said axle carrying a wheel and a member outside the wheel, independently acting steering poles oppositely and pivotally mounted in the member, furrow guide means carried thereby and flexible means connecting said poles.

11. In a steering device for traction engines, a steering wheel, and steering means associated therewith adapted to engage a furrow on two sides of the steering wheel.

12. In a steering device for traction engines, a steering wheel, and steering means associated therewith adapted to engage a furrow in advance of and behind the steering wheel.

13. In a steering device for traction engines, a steering wheel, and independent steering means associated therewith, one of which is adapted to engage a furrow in advance of the steering wheel, another in the rear of it.

14. In a steering device for traction engines, a steering wheel, and independent steering means associated therewith, one of which is adapted to engage a furrow in advance of the steering wheel, another in the rear of it, whereby a swinging movement of the steering wheel will cause one of the steering means to engage more effectively the furrow.

15. In a steering device for traction engines, a steering wheel and two steering means associated therewith engaging a furrow, one of which is pressed more intimately into contact with the furrow when the steering wheel is angled toward the furrow and the other when the steering wheel is angled away from the furrow.

In testimony whereof I affix my signature, in the presence of two witnesses.

EDWARD A. JOHNSTON.

Witnesses:
 E. HOUSTON,
 LESTER B. RUMSEY.